United States Patent
Maekawa

(10) Patent No.: US 9,209,727 B2
(45) Date of Patent: Dec. 8, 2015

(54) MOTOR CONTROL DEVICE

(71) Applicant: Kabushiki Kaisha Toshiba, Minato-ku (JP)

(72) Inventor: Sari Maekawa, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 109 days.

(21) Appl. No.: 14/161,384

(22) Filed: Jan. 22, 2014

(65) Prior Publication Data

US 2014/0292241 A1 Oct. 2, 2014

Related U.S. Application Data

(63) Continuation of application No. 13/238,346, filed on Sep. 21, 2011, now Pat. No. 8,674,652.

(30) Foreign Application Priority Data

Sep. 27, 2010 (JP) ................................. 2010-215246

(51) Int. Cl.
*H02P 23/00* (2006.01)
*H02P 6/18* (2006.01)
(Continued)

(52) U.S. Cl.
CPC ........ *H02P 6/18* (2013.01); *H02P 27/08* (2013.01); *H02M 7/5395* (2013.01); *H02M 2001/0009* (2013.01)

(58) Field of Classification Search
USPC .......... 318/400.01, 400.17, 700, 400.02, 432, 318/400.11, 400.12, 400.34, 400.09, 430, 318/599, 608, 400.13, 560, 400.04, 400.32, 318/801, 139, 805, 474, 696; 324/142, 324/765.01, 545; 363/95, 132, 39, 413; 417/44.11, 417; 180/443

See application file for complete search history.

(56) References Cited

U.S. PATENT DOCUMENTS 6,580,247 B2 * 6/2003 Nakazawa ..................... 318/700
6,914,409 B2 * 7/2005 Nukushina ..................... 318/800

(Continued)

FOREIGN PATENT DOCUMENTS

JP 3447366 7/2003
JP 2004208413 7/2004

(Continued)

OTHER PUBLICATIONS

Office Action issued Jul. 31, 2012 in Japanese Application No. 2010-215246 (with English-language translation).

*Primary Examiner* — Kawing Chan
*Assistant Examiner* — Jorge L Carrasquillo
(74) *Attorney, Agent, or Firm* — Oblon, McClelland, Maier & Neustadt, L.L.P.

(57) ABSTRACT

A motor control device includes a PWM signal generating unit comparing PWM command voltage and carrier wave with each other to generate pulse signal so that duty is increased or decreased in both directions of phase lag and phase lead with one phase within carrier period as reference regarding one phase of three-phase PWM signal. The unit generates pulse signal so that duty is increased or decreased in one of the directions with one phase as reference regarding another phase. The unit generates pulse signal so that duty is increased or decreased in direction reverse to the one direction with one phase as reference regarding the other phase. The unit generates three-phase PWM signal pattern so that a current detecting unit is capable of detecting two-phase current in synchronization with advent of two predetermined time-points within carrier wave period of PWM signal with first to third phases being normally fixed.

18 Claims, 18 Drawing Sheets

(51) Int. Cl.
*H02P 27/08* (2006.01)
*H02M 7/5395* (2006.01)
*H02M 1/00* (2007.01)

(56) References Cited

U.S. PATENT DOCUMENTS

| | | | |
|---|---|---|---|
| 7,161,323 | B2 | 1/2007 | Ajima et al. |
| 7,336,047 | B2 | 2/2008 | Ueda et al. |
| 8,541,971 | B2 * | 9/2013 | Sakai et al. .................. 318/599 |
| 2007/0103950 | A1 | 5/2007 | Arisawa et al. |
| 2007/0152624 | A1 | 7/2007 | Hamaoka et al. |
| 2008/0061726 | A1 | 3/2008 | Iwaji et al. |
| 2009/0134826 | A1 * | 5/2009 | Hamasaki ................ 318/400.32 |
| 2009/0243526 | A1 | 10/2009 | Ito et al. |
| 2009/0263260 | A1 | 10/2009 | Goto et al. |
| 2010/0045217 | A1 | 2/2010 | Ueda et al. |
| 2010/0117586 | A1 * | 5/2010 | Akiyama ...................... 318/801 |
| 2011/0292700 | A1 | 12/2011 | Arakawa et al. |

FOREIGN PATENT DOCUMENTS

| | | |
|---|---|---|
| JP | 2007082355 | 3/2007 |
| JP | 2008131770 | 6/2008 |

* cited by examiner

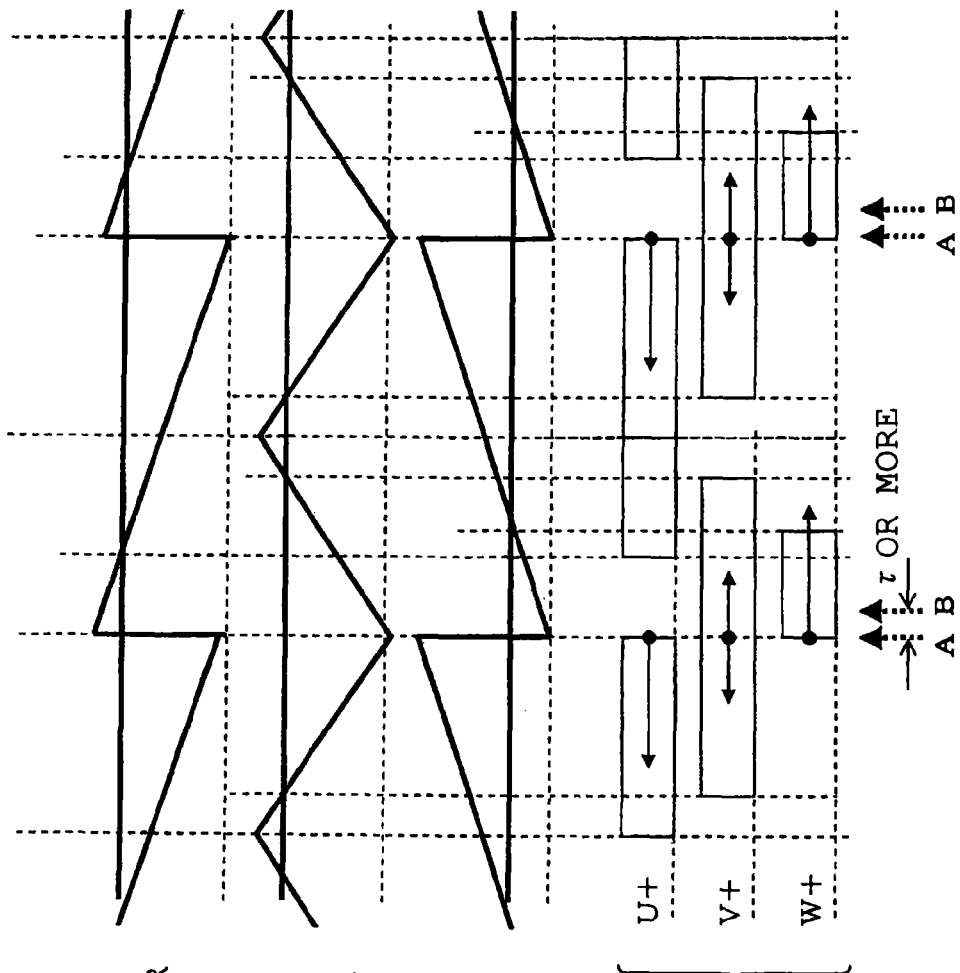

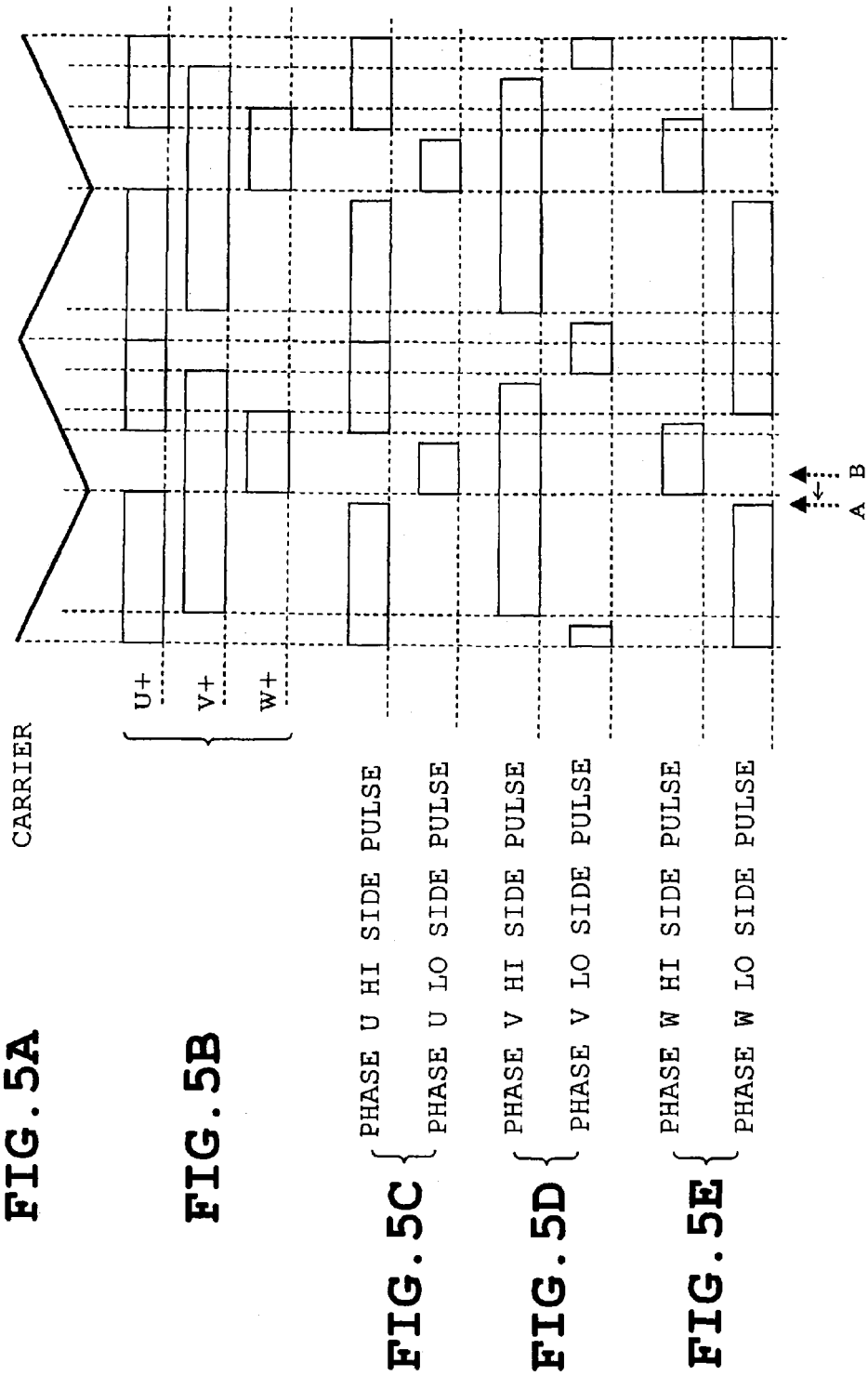

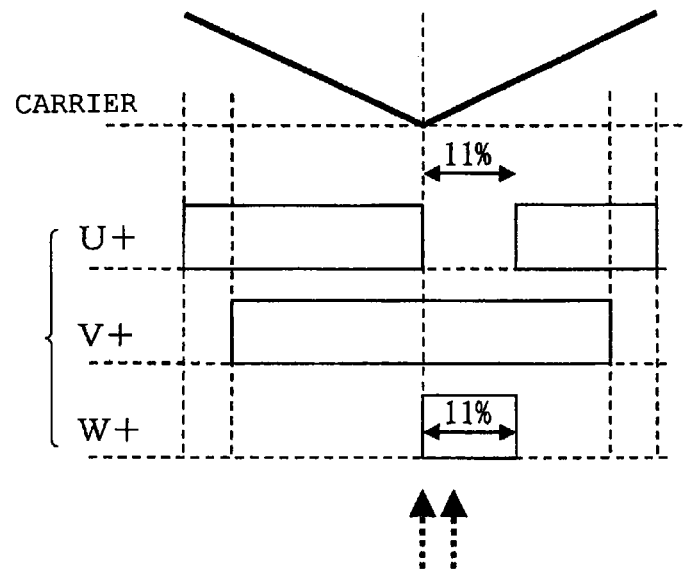
FIG. 9A
FIG. 9B
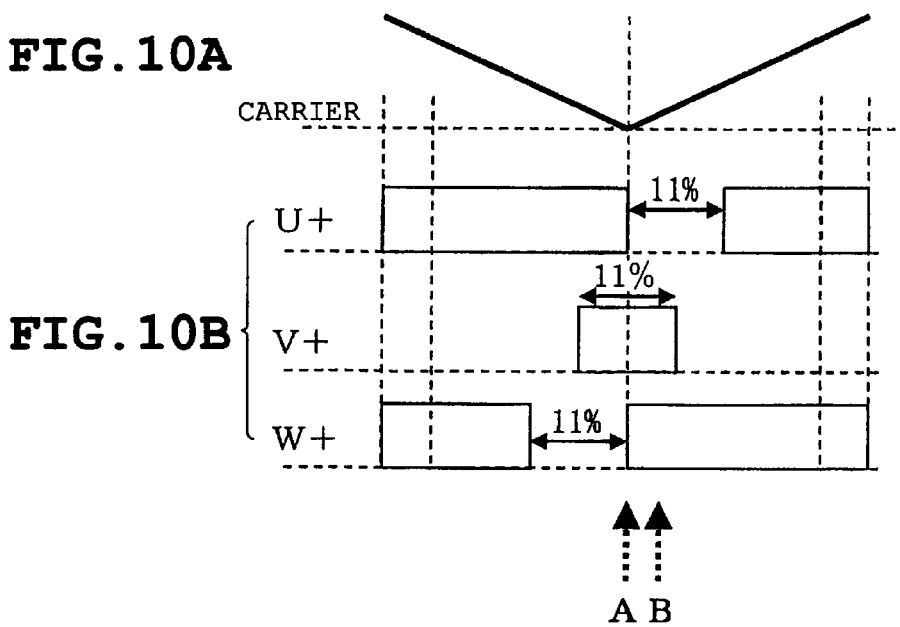
FIG. 10A
FIG. 10B

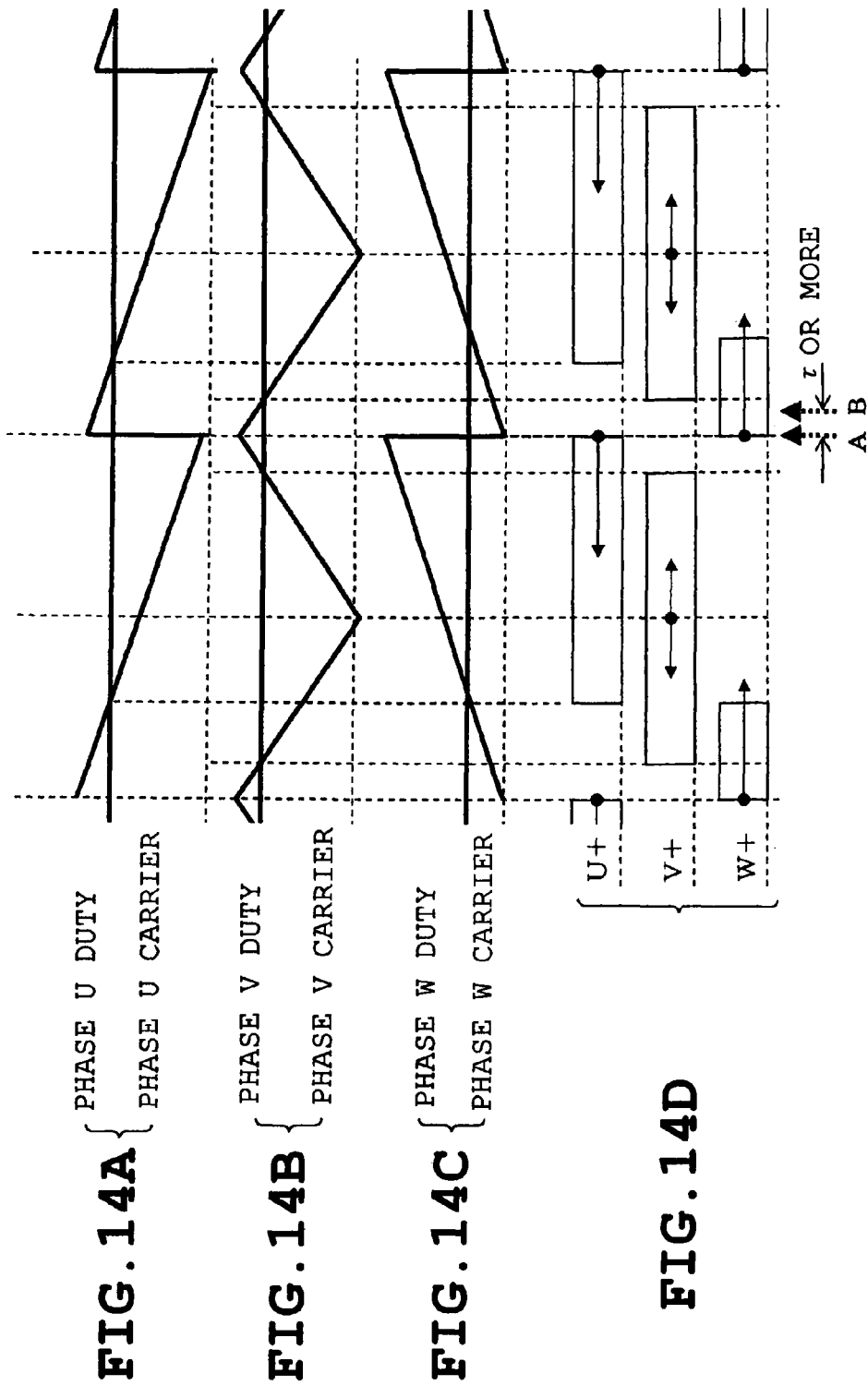

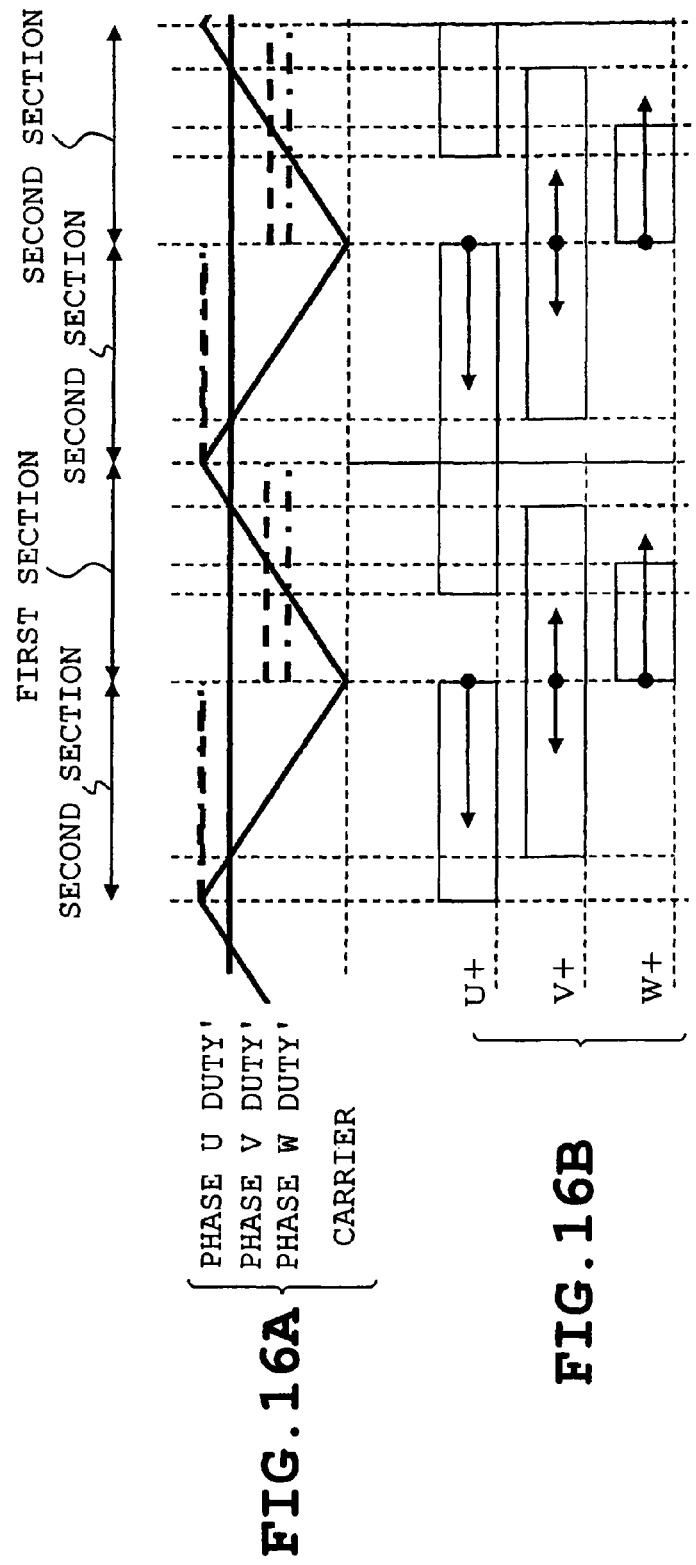

CONVERSION OF SET VALUE IN FIRST SECTION

| PHASE U DUTY' | PHASE V DUTY' | PHASE W DUTY' |
|---|---|---|
| IF PHASE U DUTY × 2<br>< CARRIER MAXIMUM VALUE<br>→ CARRIER MAXIMUM VALUE<br>OR ELSE<br>→ 2 × CARRIER MAXIMUM VALUE<br>− 2 × PHASE U DUTY | PHASE V DUTY | IF PHAE W DUTY × 2<br>< CARRIER MAXIMUM VALUE<br>→ 2 × PHASE W DUTY<br>OR ELSE<br>→ CARRIER MAXIMUM VALUE |

FIG. 17A

CONVERSION OF SET VALUE IN SECOND SECTION

| PHASE U DUTY' | PHASE V DUTY' | PHASE W DUTY' |
|---|---|---|
| IF PHASE U DUTY × 2<br>< CARRIER MAXIMUM VALUE<br>→ PHASE U DUTY × 2<br>OR ELSE<br>→ CARRIER MAXIMUM VALUE | PHASE V DUTY | IF PHASE W DUTY × 2<br>< CARRIER MAXIMUM VALUE<br>→ CARRIER MAXIMUM VALUE<br>OR ELSE<br>→ 2 × CARRIER MAXIMUM VALUE<br>− 2 × PHASE W DUTY |

FIG. 17B

FIG. 18A
RELATED ART
CARRIER
FIG. 18B
RELATED ART
U+
V+
W+
FIG. 18C
RELATED ART
URRENT OF SHUNT RESISTANCE
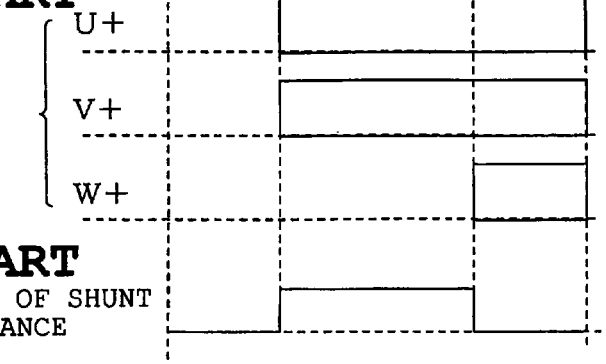
FIG. 19A
RELATED ART
CARRIER
FIG. 19B
RELATED ART
U+
V+
W+
FIG. 19C
RELATED ART
URRENT OF SHUNT RESISTANCE
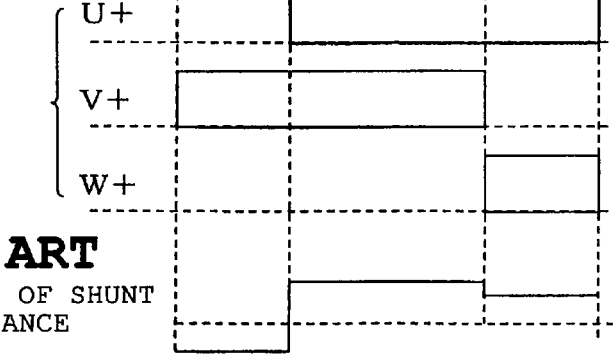

US 9,209,727 B2

MOTOR CONTROL DEVICE

CROSS-REFERENCE TO RELATED APPLICATIONS

This application is a continuation of and claims the benefit of priority under 35 U.S.C. §120 from U.S. Ser. No. 13/238,346 filed Sep. 21, 2011, and claims the benefit of priority under 35 U.S.C. §119 from Japanese Patent Application No. 2010-215246 filed Sep. 27, 2010, the entire contents of each of which are incorporated herein by reference.

FIELD

Embodiments described herein relate to a motor control device which detects a phase current by the use of a current detecting element disposed in a direct current part of an inverter circuit.

BACKGROUND

A current detection technique is known in which phase currents are detected by a single shunt resistance inserted in a direct current part of an inverter circuit when phase U, V and W currents are detected for the purpose of motor control. A three-phase PWM signal pattern needs to be generated so that two or more phase currents can be detected within one period of a pulse width modulation (PWM) carrier (a carrier wave), in order that all the three phase currents may be detected by the use of the aforementioned system. For example, when both U+ (symbol "+" designates an upper arm switching element of the inverter circuit) and V+ are ON and W+ is OFF under the condition where phase U and V duties are equal to each other, phase W current can be detected but the other two phase currents cannot be detected, as shown in FIGS. 18A to 18C in which a saw-tooth wave serves as a carrier. Accordingly, it is proposed that the phase of one phase PWM signal (the phase W in this case) be shifted so that two or more phase currents are normally detectable, as shown in FIGS. 19A to 19C.

However, when the phase PWM signals are sequentially shifted for current detection, a motor current presents a stepwise variation in synchronization with transition from a pattern in which one phase PWM signal is being shifted to another pattern in which another phase PWM signal is shifted, as shown in FIGS. 20A and 20B. FIG. 20B shows a partially enlarged part of FIG. 20A. When the phase U current repeats increase and decrease alternately repeatedly for every carrier period, decrease occurs twice consecutively in synchronization with the aforementioned pattern transition, whereupon the stepwise variation as shown in FIG. 20A occurs. Current variations in this case cause torque fluctuations, resulting in a problem that the noise level is increased during drive of the motor.

BRIEF DESCRIPTION OF THE DRAWINGS

FIGS. 3A to 3C are timing charts showing PWM carriers, duty commands of respective phases and FIG. 3D is a timing chart showing the generation states of the respective phase PWM signal pulses;

FIGS. 5A to 5E are timing charts showing the case where the PWM signal pulse shown in FIG. 3 (*d*) is provided with dead time;

FIGS. 9A and 9B are views similar to FIG. 7B, showing the case where an electrical angle is 300 degrees in FIG. 8;

FIGS. 10A and 10B are views similar to FIGS. 9A and 9B, showing the case where an electrical angle is 180 degrees in FIG. 8;

FIGS. 14A to 14D are views similar to FIGS. 3A to 3D, showing a third embodiment;

FIGS. 16A and 16B are views similar to FIGS. 3A to 3D;

FIGS. 17A and 17B show logics of duty conversion executed by the pulse generator;

FIGS. 18A to 18C are views similar to FIGS. 7A and 7B, showing a related art;

FIGS. 19A to 19C are views similar to FIGS. 7A and 7B, showing the related art.

DETAILED DESCRIPTION

In general, according to one embodiment, a motor control device includes an inverter circuit which includes a plurality of switching elements connected into a three-phase bridge configuration and is configured to convert a direct current into a three-phase alternate current to drive an electric motor. A current detecting element is connected to a direct current side of the inverter circuit, thereby generating a signal corresponding to a current value. A PWM signal generating unit is configured to determine a rotor position based on the phase current of the motor and to generate a three-phase PWM signal pattern so that the signal pattern follows the rotor position. A current detecting unit is configured to detect the phase current based on the signal generated by the current detecting element and the PWM signal pattern. The PWM signal generating unit is configured to compare a PWM command voltage and a carrier wave with each other thereby to generate a pulse signal so that a duty is increased or decreased in both directions of phase lag and phase lead with anyone of phases within the carrier period serving as a reference regarding one phase of a three-phase PWM signal. The PWM signal generating unit is configured to generate a pulse signal so that a duty is increased or decreased in one of the directions of phase lag and phase lead with anyone of phases within the carrier period serving as a reference regarding another phase of the three-phase PWM signal. The PWM signal generating unit is configured to generate a pulse signal so that a duty is increased or decreased in a direction reverse to said one of the directions phase lag and phase lead with anyone of phases within the carrier period serving as a reference regarding the other phase of the three-phase PWM signal, whereby the PWM signal generating unit is configured to generate the three-phase PWM signal pattern so that the current detecting unit is capable of detecting a two-phase current in synchronization with advent of two predetermined time-points within a carrier wave period of the PWM signal with the first to third phases being normally fixed without phase substitution.

Figure 1:
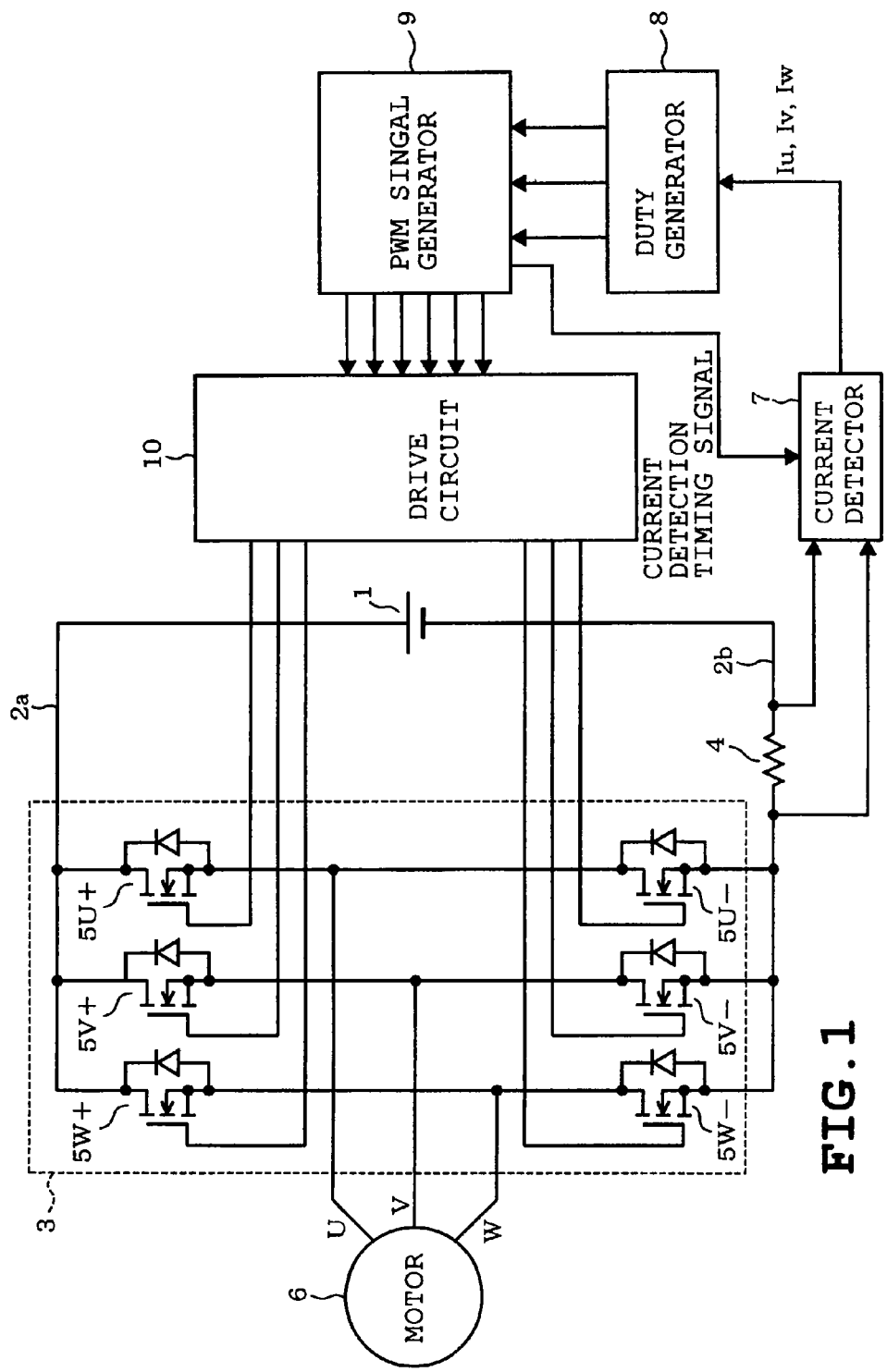
FIG. 1 is a functional block diagram showing an electrical arrangement of the motor control device according to a first embodiment.

One embodiment will be described with reference to FIGS. 1 to 11. Referring to FIG. 1, an electrical arrangement of the motor control device is shown in the form of a functional block diagram. Although designated by a symbol of direct current supply, a direct current (DC) supply 1 may include a rectifier circuit, a capacitor and the like when DC supply is generated from a commercial alternate current (AC) supply. An inverter circuit (a DC/AC converter) 3 is connected via positive and negative bus bars 2a and 2b to the DC supply 1. A shunt resistance 4 serving as a current detecting element is inserted into the negative bus bar 2b side. The inverter circuit 3 comprises, for example, n-channel power MOSFETs 5 (U+, V+, W+, U−, V− and W−) connected into a three-phase bridge configuration. Phase output terminals are connected to phase windings of an electric motor 6 comprising a brushless DC motor, for example, respectively.

A terminal voltage (a signal corresponding to a current value) of the shunt resistance 4 is detected by a current detector 7. The current detector (a current detecting unit) 7 detects phase U, V and W currents Iu, Iv and Iw based on the terminal voltage and a three-phase PWM signal pattern supplied by the inverter circuit 3. When the phase currents detected by the current detector are supplied to a duty generator 8 to be A/D converted and read, computing is executed on the basis of control conditions of the motor 6 and the like. As a result, duties U_DUTY, V_DUTY and W_DUTY to generate three phase PWM signals are determined.

In execution of a vector control, for example, the duty generator 8 generates a torque current command $I_{qref}$ based on the difference between a rotational speed command $\omega_{ref}$ of the motor 6 and an actual rotational speed of the motor 6 estimated when supplied with the rotational speed command $\omega_{ref}$ from a microcomputer which sets control conditions, or the like. When a rotor position θ of the motor 6 has been determined from three-phase currents $I_u$, $I_v$ and $I_w$, a torque current $I_q$ and an excitation current $I_d$ are calculated by a vector control calculation that uses the determined rotor position θ. For example, a proportional-integral (PI) control calculation is executed with respect to the difference between the torque current command $I_{qref}$ and the torque current $I_q$, whereby a voltage command $V_q$ is generated. The same processing as described above is executed with respect to the excitation current $I_d$ side to generate a voltage command $V_d$. The voltage commands $V_q$ and $V_d$ are converted into three-phase voltages $V_u$, $V_v$ and $V_w$ with the use of the aforesaid rotor position θ. Phase duties U_DUTY, V_DUTY and W_DUTY are determined on the basis of the three-phase voltages $V_u$, $V_v$ and $V_w$ respectively.

The phase duties U_DUTY, V_DUTY and W_DUTY are then supplied to a PWM signal generator (a PWM signal generating unit) 9 which compares levels of the phase duties U_DUTY, V_DUTY and W_DUTY with the level of a carrier wave thereby to generate three-phase PWM signals, respectively. Furthermore, lower arm signals which are obtained by inverting the three-phase PWM signals are also generated and supplied to the drive circuit 10 after dead times have been added to the respective lower arm signals, if necessary. According to the supplied PWM signals, the drive circuit 10 supplies gate signals to gates of six power MOSFETs 5 (U+, V+, W+, U−, V− and W−) which configure the inverter circuit 3. Regarding the upper arm of the inverter circuit 3, gate signals are supplied with respective potentials stepped up by necessary levels.

The following describes a manner that the PWM signal generator 9 generates three-phase PWM signals. When the inverter circuit 3 supplies pulse-width modulated three-phase alternate currents, current of a specified phase can be detected according to an energization pattern for the upper arm FETs 5 (U+, V+ and W+), as described above. Although the following describes phase upper arm gate signals, for example, voltages induced at both ends of the shunt resistance 4 correspond to a phase U current in the period of an energization pattern in which only phase U is at a high-voltage level and both phases V and W are at low-voltage level. Furthermore, sign-inverted both end voltages of the shunt resistance 4 correspond to the phase W current in the period of an energization pattern in which both phases U and V are at the high-voltage level and the phase W is at the low-voltage level. Thus, when two-phase currents are in turn detected according to the energization pattern of PWM signals and data of the detected currents is stored, three-phase currents can be detected though time-multiplexed. In this case, error actually results from the above-described detecting manner since the phase currents are not detected simultaneously. However, an energization pattern for a subsequent period can be calculated without practical problems by solving a circuit equation using detected three-phase current values unless a special exactitude is required.

Figure 11:
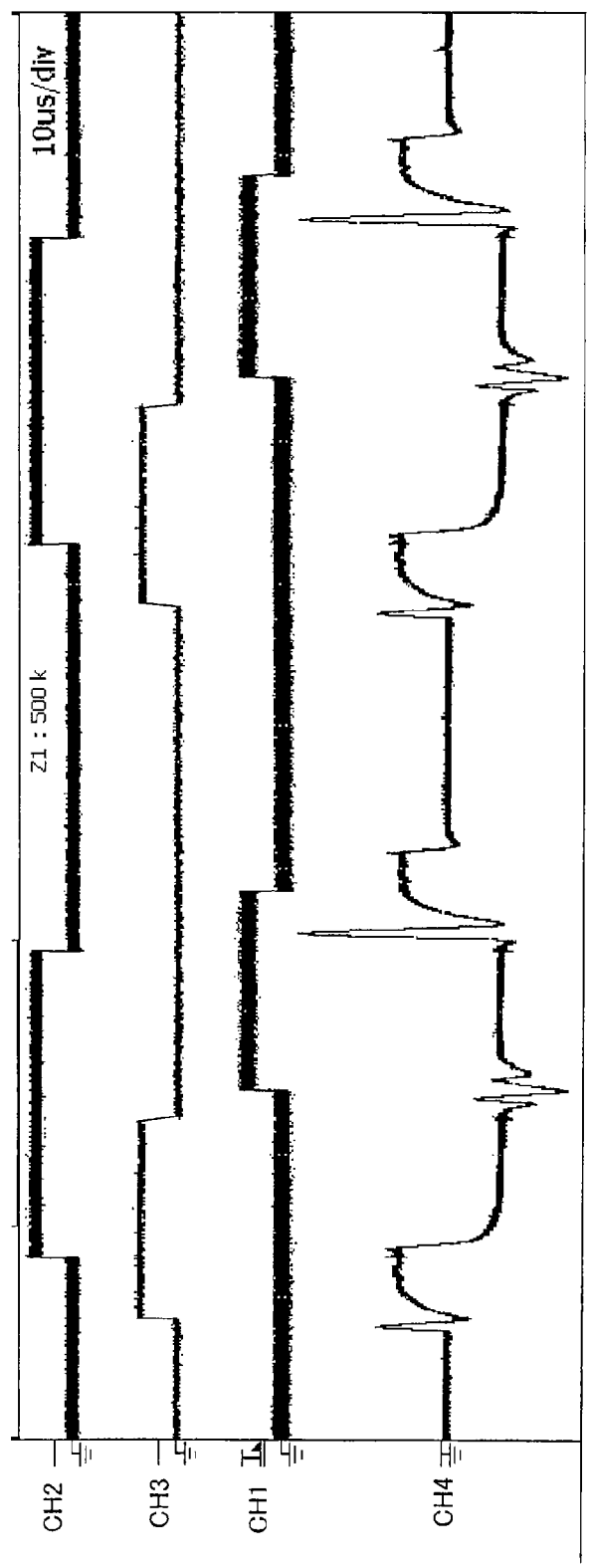
FIG. 11 shows the state where the motor current varies.

Furthermore, since the current waveforms are unstable immediately after changes in on/off states of the respective FETs 5, a minimum standby time (a stability time) τ is required in order that a voltage signal induced in the shunt resistance 4 may be read in a stable state. FIG. 11 shows a fluctuating waveform of phase U current observed by an oscilloscope (CH4) when an energization pattern of PWM signals is switched. FIG. 11 denotes that the current waveform fluctuates to a large extent like ringing. When the standby time τ is set at 3μ sec., for example, a specific energization state (a PWM signal pattern) needs to be continued for more than 3μ sec. More specifically, when a single energization state is continued for a time period shorter than 3μ sec., the data of current cannot be read normally such that the phase current value to be renewed at that time cannot be updated. In other words, a phase current can be detected in any case if energization states in all the PWM signal patterns can be continued for more than the minimum standby time τ.

In the embodiment, an output phase of each phase PWM signal pulse is then shifted in a manner differing from conventional manners. Voltage applied via the inverter circuit 3 to the motor 6 remains unchanged even when pulse rising and trailing locations are shifted for the same period of time under the condition that interphase duty difference in each phase is constant. That is, PWM signal patterns as shown in FIGS. 7A and 7B are the same voltage applied to the motor 6 since the interphase voltage is equal.

Figure 2:
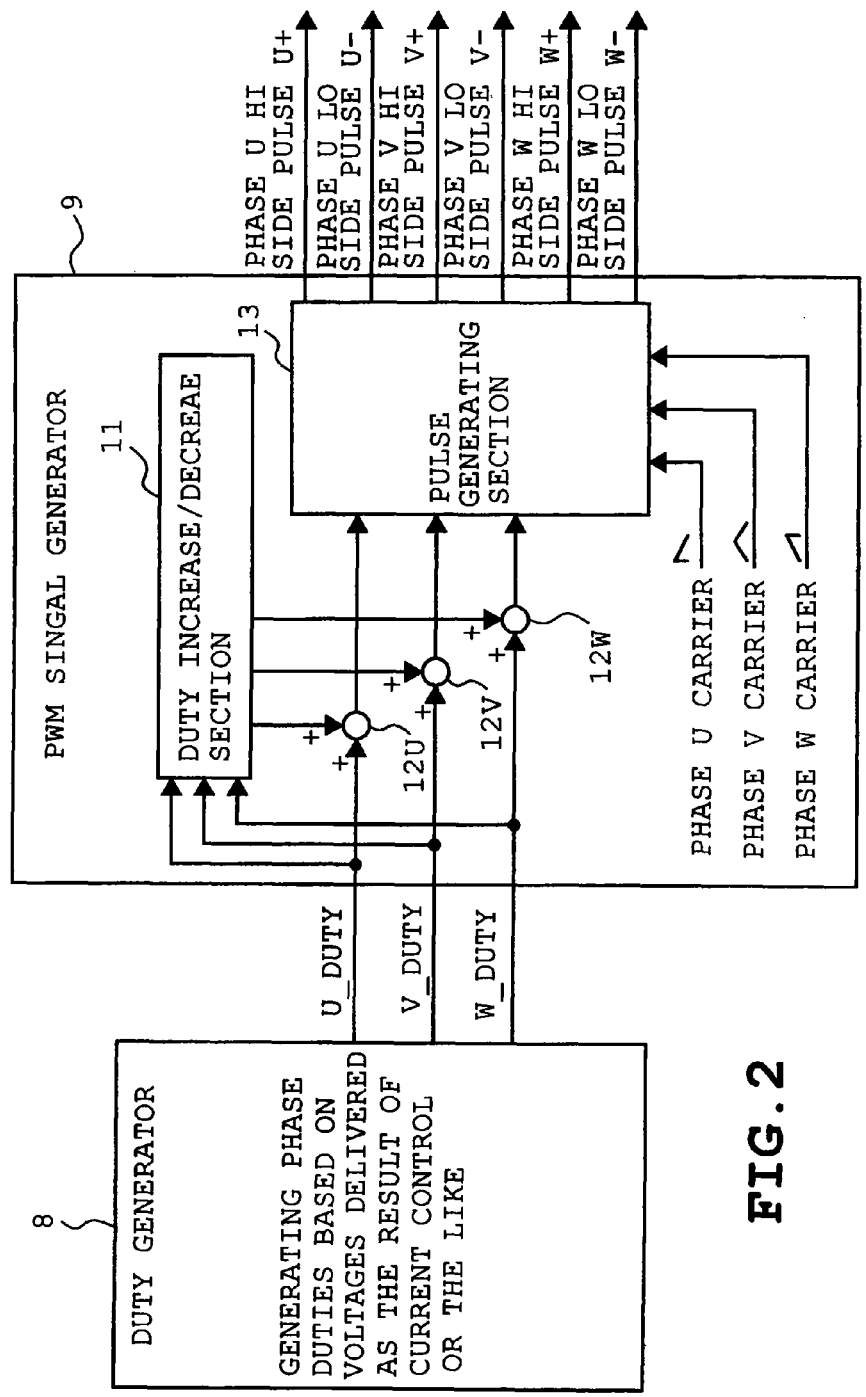
FIG. 2 is a functional block diagram showing an internal arrangement of a PWM signal generator.

FIG. 2 shows an inner configuration of the PWM signal generator 9. FIG. 3 is a timing chart showing pulse generation of three-phase PWM signals (U+, V+ and W+) at the upper arm in the PWM signal generator 9. When an additional value is supplied from the duty increase/decrease section 11, duties are added via adders 12U, 12V and 12W to the phase duties U_DUTY, V_DUTY and W_DUTY generated by the duty generator 8, as will be described in detail in a second embodiment. Output signals of the adders 12U, 12V and 12W are supplied to a pulse generator 13, which compares levels of the supplied output signals of the adders with the levels of the phase U, V and W carriers (the carrier waves), whereupon three-phase PWM signals U±, V± and W± are generated.

More specifically, the carriers used in the embodiment have different waveforms for every phase. The phase U carrier has a saw-tooth waveform and the phase V carrier has a triangular waveform as shown in FIGS. 3A and 3B respectively. The phase W carrier has a saw-tooth waveform obtained by reversing the saw-tooth waveform of the phase U carrier as shown in FIG. 3C. These phase carriers are supplied so that a phase in which an amplitude level of the phase U carrier is maximum corresponds with a phase in which amplitude levels of the phase V and W carriers are minimum. These carriers can be generated by three counters which count synchronously, respectively. A down counter is used for the phase U, an up/down counter is used for the phase V and an up counter is used for the phase W. The frequency at which the up/down counter counts is twice as high as those of the other counters. Each carrier has a period set at 50µ sec., for example.

The pulse generator 13 compares levels of the phase duties U_DUYT, V_DUTY and W_DUTY with levels of the carriers respectively, thereby supplying high level pulses in a period when "duty">"carrier". Consequently, when a phase in which the amplitude of the phase V carrier is minimum (a bottom of the triangular wave) is a reference wave, the pulse width of the phase U PWM signal pulse U+ varies so as to be increased or decreased in the direction of phase lag (leftward in FIG. 3D) from the reference phase. The pulse width of the phase W PWM signal pulse W+ varies so as to be increased or decreased in the direction of phase lead (rightward in FIG. 3D) from the reference phase. The pulse width of the phase V PWM signal pulse V+ varies so as to be increased and decreased in the directions of phase lag and phase lead from the reference phase.

A current detection timing signal (phase V carrier, for example) is supplied from the PWM signal generator 9 to the current detector 7. The current detector 7 determines the timings for detecting two phase currents according to the current detection timing signals respectively. For example, the phase in which the phase V carrier has a minimum amplitude is determined to be a reference phase. When the reference phase is referred to as "detection timing A", a time-point when the standby time τ or more elapses from the detection timing A is referred to as "detection timing B." In a case where the detection timings have been set in the manner as described above, phase W current (−) $I_W$ can be detected in synchronization with advent of a time-point within the reference phase (the detection timing A), and phase U current (−) $I_u$ can be detected in synchronization with another time-point with the reference phase the detection timing B). The carrier referred to by the current detector 7 when the current detection timings are determined should not be limited to phase V carrier. Phase U or W carrier may be referred to, instead of phase V carrier.

FIG. 3D shows that the amplitude of phase U PWM signal pulse is 0 in the reference phase. However, since various response lags actually occur, FET 5U+ is in on-state even by the use of the detection timing A. As a result, phase W current Iw can be detected with no incident. Furthermore, since a sum total of three-phase currents is zero, phase V current $I_v$ is obtained on the basis of phase W current $I_w$.

Figures 4A, 4B:
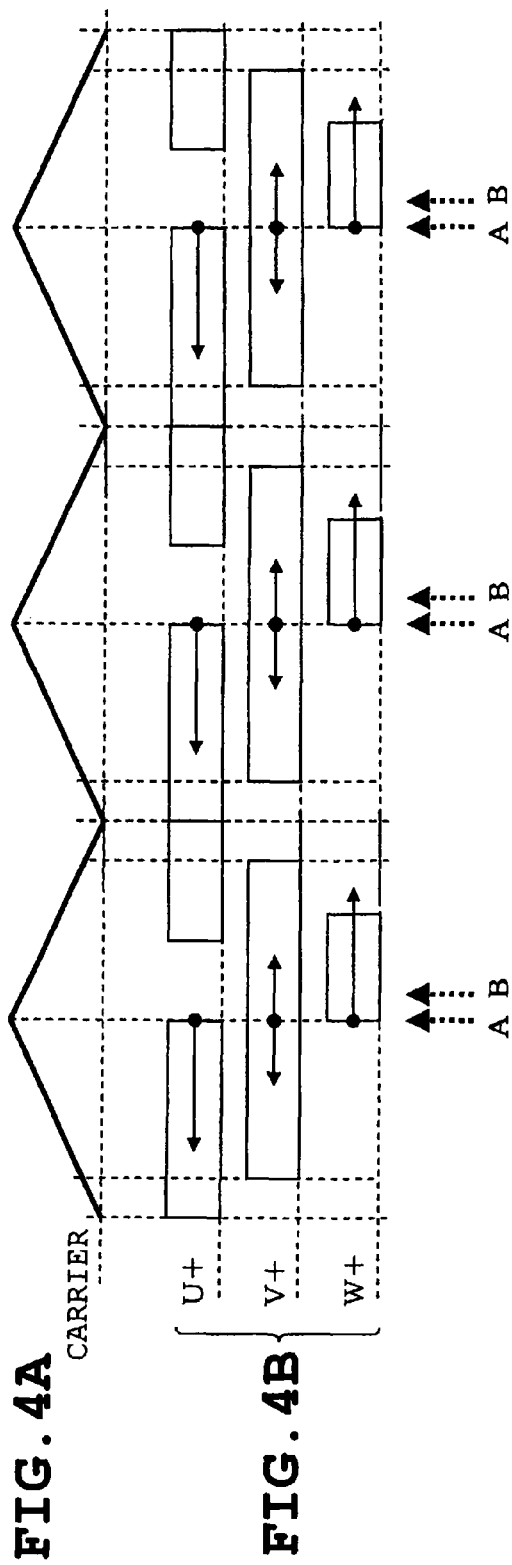
FIGS. 4A and 4B are views similar to FIG. 3D, showing the case where the phase in which the phase V carrier is maximum serves as a reference.

Furthermore, FIGS. 4A and 4B show a case where the reference phase is a phase (the peak of the triangular wave) in which phase V carrier is maximum. Although FIGS. 4A and 4B show nothing about the phase U and W carriers, a phase in which phase U carrier is maximum and a phase in which phase W carrier is minimum are caused to correspond with the aforementioned reference. Regarding phase V, PWM signal pulses are supplied within a period in which phase V carrier is higher than the level of duty V_DUTY. Furthermore, phases U, V and W may be replaced by one another or it is optional what waveform carrier should be used and to what phase the carrier should be applied.

FIGS. 5A to 5E show a case where the PWM signal pulse as shown in FIG. 3D is provided with dead time. FIG. 5B shows the same waveform as shown in FIG. 3D. Predetermined duty is subtracted from the waveforms as shown in FIG. 5B uniformly with respect to three-phase PWM signals U±, V± and W±, whereby dead times are generated. When the dead times are generated as described above, there is a possibility that FET 5U+ may be turned off by the use of the detection timing A. Accordingly, the detection timing A is adjusted so as to be shifted to the phase lead side relative to the timing in which the carrier amplitude becomes zero. Furthermore, a dead time generation pattern should not be limited to that shown in FIGS. 5A to 5E. The current detection timings A and B may also be shifted according to respective generation patterns in the same manner as described above.

Figure 6:
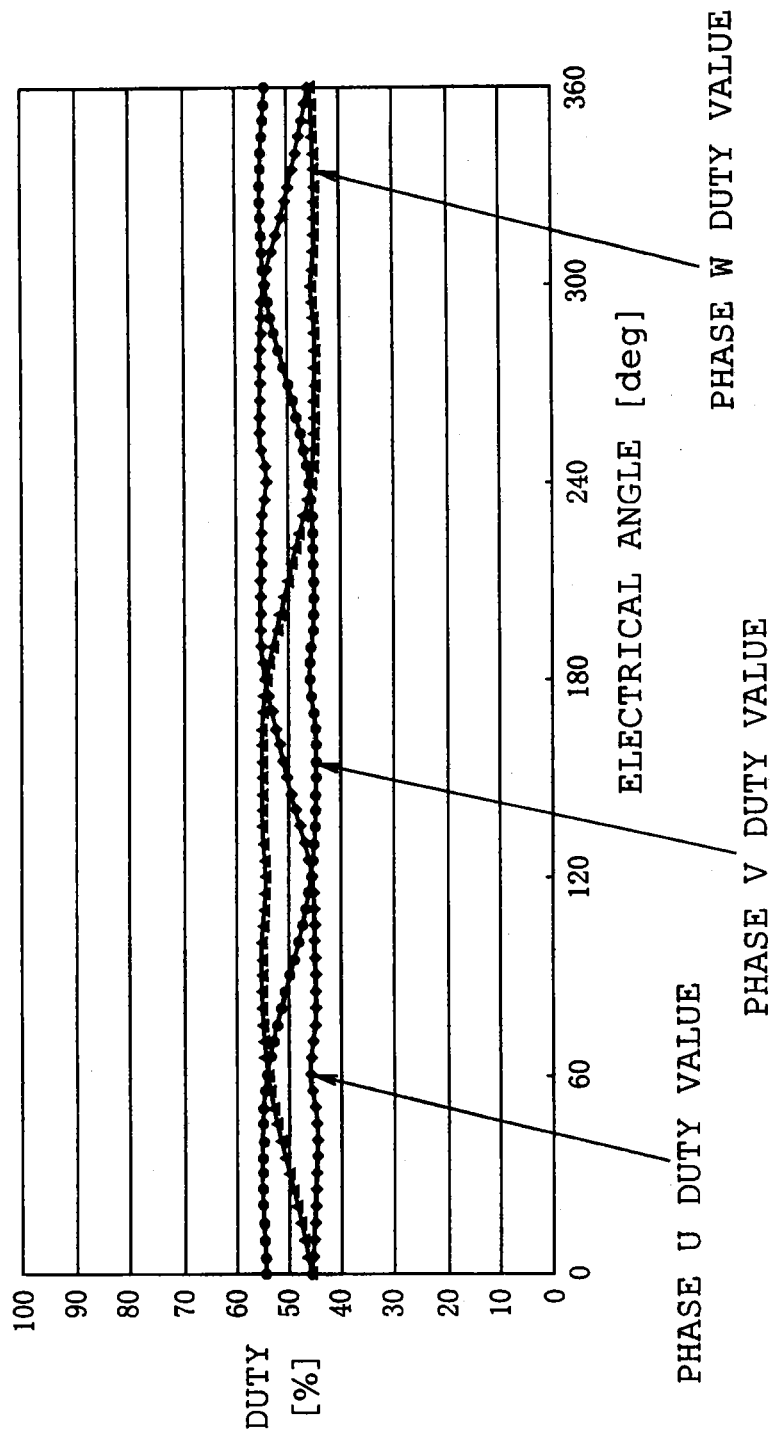
FIG. 6 is a graph showing set duties of respective phases corresponding to the case where the voltage applied to the motor is in the proximity of 0 V.
Figure 7:
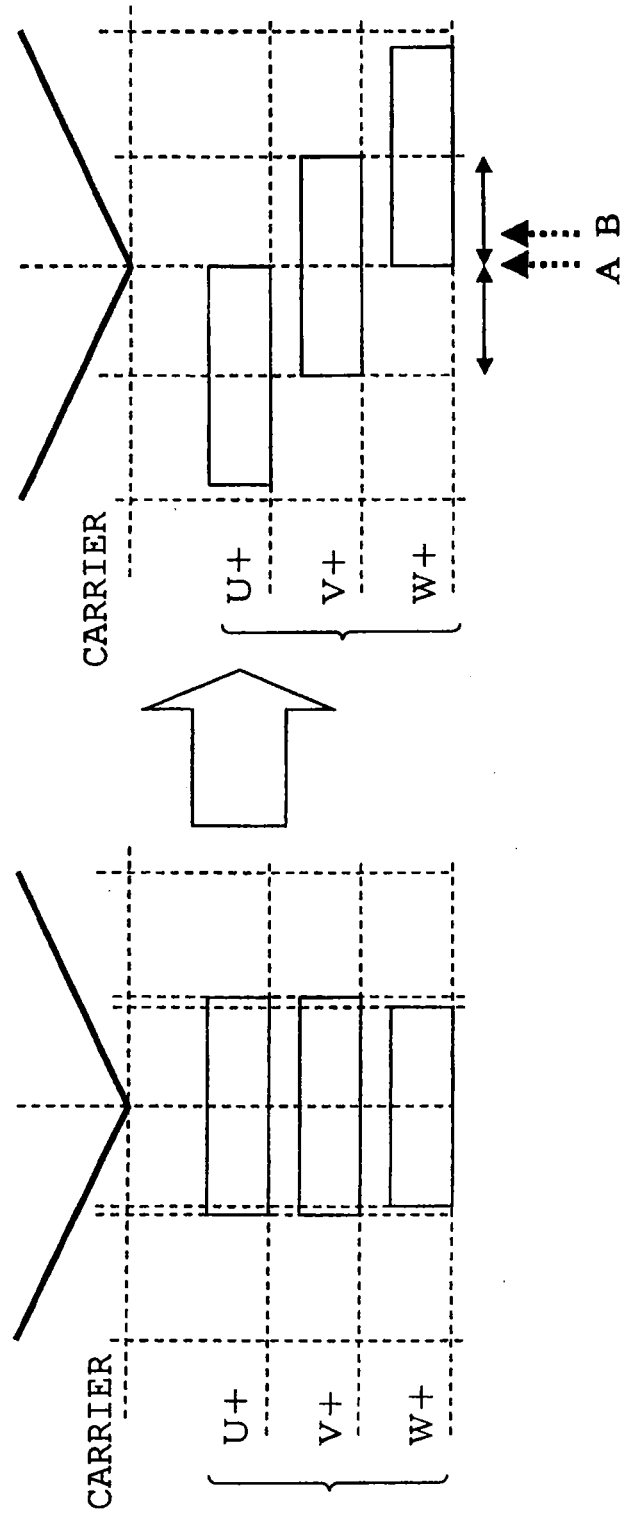
FIG. 7A shows a case where the centers of phase PWM signals correspond to the zero level of the carrier and FIG. 7B is a view similar to FIG. 3D.

The following describes influences of changes in the phase duties upon current detection in a case where three-phase PWM signal pulses are supplied in the above-described phase relationship. FIG. 6 shows set three-phase duties corresponding to motor electrical angle (rotor position θ) in a case where voltage applied to the motor becomes approximately 0 volts. Since the three-phase duties are about 50% and are balanced with one another in this case, no current can be detected according to the detection timings A and B when the centers of the three-phase PWM signal pulses are coordinated with zero level of the carriers as shown in FIG. 7A. However, the three-phase PWM signal patterns as shown in FIG. 7B are obtained by the manner of the embodiment. As a result, two-phase currents can be detected according to the detection timings A and B.

Figure 8:
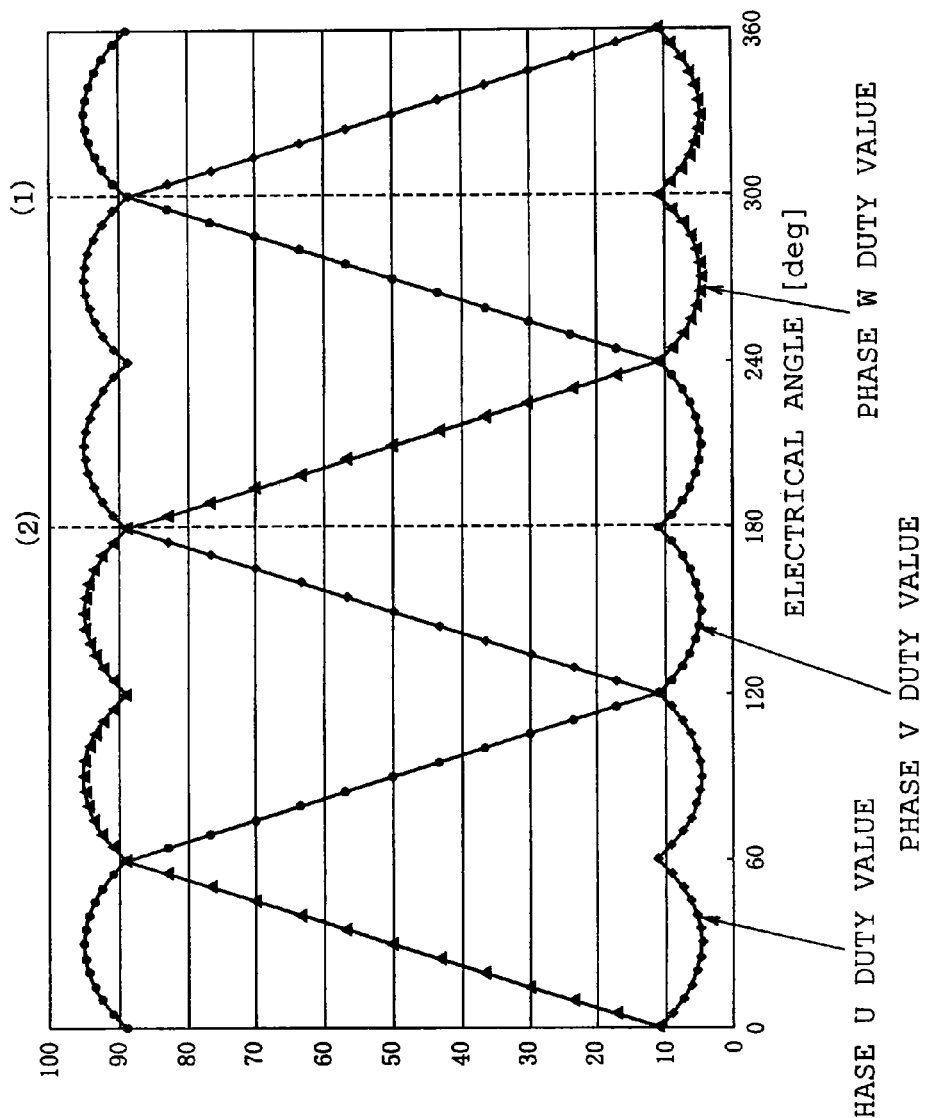
FIG. 8 is a view similar to FIG. 6, showing the case where voltage applied to the motor is higher.

FIG. 8 shows set duties of the respective phases when voltage applied to the motor is high. Symbol "A" in FIG. 8 designates a case where the electrical angle is 300 degrees, phase U and V duties are equally 89% and phase W duty is 11%. In this case, regarding phase W, pulses are generated in a period from the bottom of the triangular wave to the vicinity of duty 11% in the direction of phase lag (rightward in FIGS. 9A and 9B) in the PWM pattern as shown in FIG. 9B. However, since the pulse width is 6µ sec. at duty 11% though τ=3µ sec., two-phase current can be detected by the use of the detection timings A and B. Furthermore, symbol "B" in FIG. 8 designates a case where the electrical angle is 180 degrees, phase U and W duties are equally 89% and phase V duty is 11%. In this case, too, two-phase current can be detected according to the detection timings A and B as shown in FIGS. 10A and 10B.

Thus, the reference phase increasing/decreasing the PWM pulses remains fixed even when set duties of the respective phases are changed, whereupon three-phase motor current can be detected with regard to all the PWM patterns even when the current detection timings are fixed. Accordingly, torque fluctuation and noise production can be suppressed since current is prevented from stepwise variation, as shown in FIGS. 20A to 20D. Consequently, three-phase motor current can be detected when voltage applied to the motor is low and high. However, a theoretical maximum detectable motor voltage ranges from a case where two-phase duties are increased to ((carrier period)−(τ (time)×2)) to a case where the minimum duties are decreased to (τ (time)×2).

In the foregoing embodiment, when MOSFETs 5U±, 5V± and 5W± composing the inverter circuit 3 are on/off controlled according to the predetermined PWM signal patterns, the shunt resistance 4 is connected at the DC bus bar 2b side of the inverter circuit 3. The PWM signal generator 9 determines the rotor position θ based on the phase current of the motor 6 and generates a three-phase PWM signal pattern so that the patterns follow the rotor position θ. When the current detector 7 detects the phase current of the motor based on a signal generated by the shunt resistance 4 and the PWM signal pattern, the PWM signal generator 9 generates the three-phase PWM signal pattern so that the current detector 7 can detect two-phase current according to two timings fixed within the carrier period. Accordingly, deferring from conventional motor control devices, the motor control device of the embodiment prevents the three-phase current from stepwise variations and suppresses torque fluctuation and noise production. As a result, the three-phase currents Iu, Iv and Iw can be detected even when the voltage applied to the motor is low or high.

The PWM signal generator 9 increases/decreases the duty in both directions of phase lag and phase lead on the basis of any phase in the carrier period regarding one of the three-phase PWM signals (the first phase). Regarding one of the other two phases (the second phase), the PWM signal generator 9 increases/decreases the duty in one of the directions of phase lag and phase lead on the basis of any phase in the carrier period. Regarding the other phase (the third phase), the PWM signal generator 9 increases/decreases the duty in the direction opposed to the aforesaid direction with respect to the second phase on the basis of any phase in the carrier period.

When the detection timings are fixed so as to belong to a first period in which first and second phase switching elements are simultaneously turned on and a second period in which the first and third phase switching elements are simultaneously turned on, the third phase current can be detected in the first period and the second phase current can be detected in the second period. The PWM signal generator 9 sets the three-phase references based on the phase in which the carrier amplitude is maximum or minimum. The timing of current detection by the current detector 7 can readily be set on the basis of the aforesaid phase.

Furthermore, the PWM signal generator 9 uses the triangular wave as the carrier regarding the phase V of the three-phase PWM signals. Regarding phase U, the PWM signal generator 9 uses the saw-tooth wave as the carrier so that the phase in which triangular wave amplitude maximum corresponds with the phase in which the triangular wave amplitude is maximum or minimum. Regarding phase W, the saw-tooth wave having a reverse phase relationship with the aforesaid saw-tooth wave is used as the carrier. The phase references are set on the basis of the phase in which all the maximum or minimum values of carrier amplitudes correspond with one another. Accordingly, the phase directions in which the duties of the three-phase PWM signals are increased/decreased can be changed by using the carriers having different waveforms for every phase.

Figures 12A, 12B:
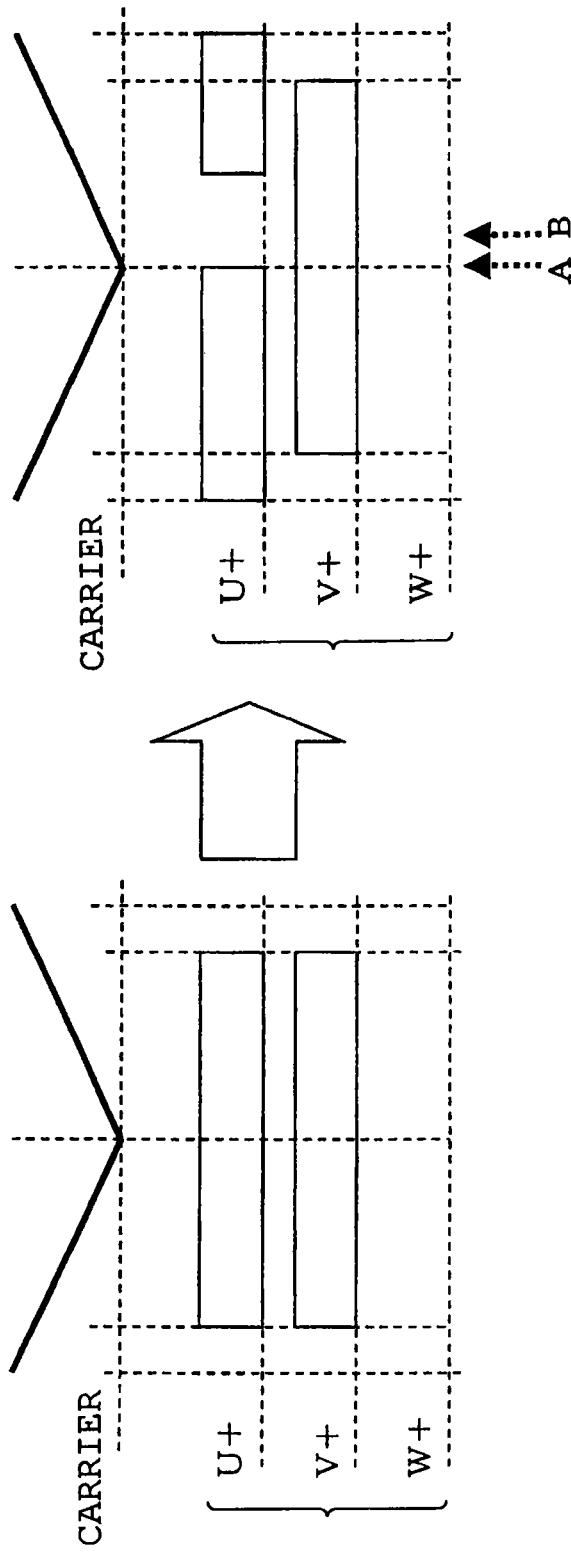
FIGS. 12A and 12B are views similar to FIGS. 7A and 7B, showing the case where two-phase modulation is carried out in a second embodiment.

FIGS. 12 and 13 illustrate a second embodiment. In the second embodiment, identical or similar parts to those of the first embodiment are labeled by the same reference symbols and the description of these parts is eliminated. Only the differences between the first and second embodiments will be described. The first embodiment is directed to three-phase modulation in which a duty of the three-phase PWM signal is normally set at zero or above. The second embodiment is directed to a two-phase modulation in which one of the three-phase duties is set at zero. In this case, when each of the other two-phase duties is set at (τ (time)×2) or above, the phase currents can be detected with no incident (see FIGS. 12A and 12B).

Figures 13A, 13B:
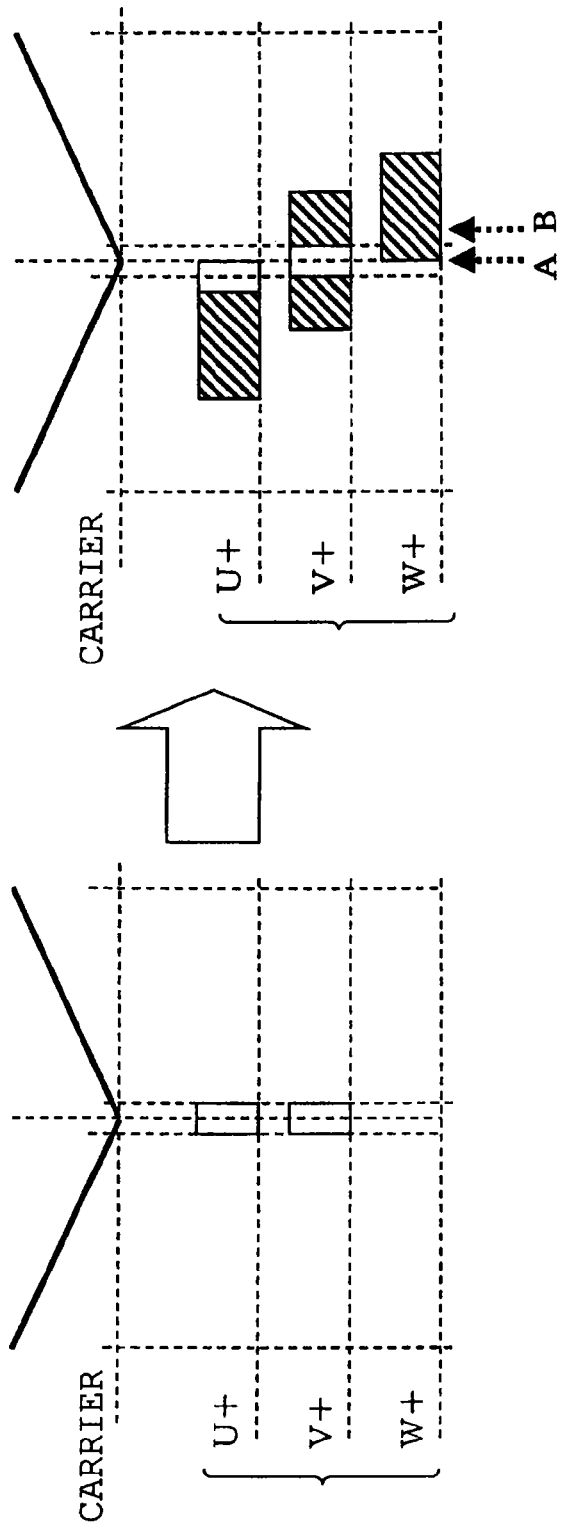
FIGS. 13A and 13B are views similar to FIGS. 10A and 10B, showing the case where voltage applied to the motor is small.

On the other hand, the phase currents cannot be detected when the voltage applied to the motor is low and the duty is at (τ (time)×2) or below, as shown in FIG. 13A. Accordingly, the same duty is equally added to each of the three-phase duties (hutched parts in FIG. 13B) so that the three-phase duties become (τ (time)×2) at the minimum, as shown in FIG. 13B. In this case, the three-phase modulation is temporarily is executed. The interphase duty differences (voltage differences) are not changed even when the same duty is added to each of the three-phase duties. Consequently, voltage applied to the motor remains unchanged. Even when the voltage applied to the motor is small, the phase currents can be detected with no incident as the result of execution of the above-described processing.

The above-described control manner can be applied to the three-phase modulation. The same duty is equally added to the three-phase duties so that the minimum one of the three-phase duties becomes (τ (time)×2) or above. However, when the voltage applied to the motor is extremely high (phase U: 98%, phase V: 2% and phase W: 2%, for example) and the interphase voltage is below τ (time), the same duty cannot be added to the phase duties as described above, which shows the limitation of additional correction.

The above-described processing is executed by the duty increase/decrease section 11 of the PWM signal generator 9 as shown in FIG. 2. The duty increase/decrease section 11 compares the phase duties U_DUTY, V_DUTY and W_DUTY with (τ (time)×2). When a command value of any one of the phases becomes below (τ (time)×2), an equal added value is added to the phase duties U_DUTY, V_DUTY and W_DUTY so that the command value of the one phase becomes τ (time)×2).

In the second embodiment, when the phase PWM duties are insufficient for generation of the three-phase PWM signal pattern on which the current detector 7 can detect two-phase currents, the PWM signal generator 9 adds the same duty to the phase PWM duties by the duty increase/decrease section 11 and generates PWM signals. As a result, the current detector 7 can detect two-phase currents by the use of normally fixed detection timings without change in line voltage applied to the motor 6. The duty increase/decrease section 11 carries out the duty addition so that the minimum duty of the three phases doubles the minimum standby time τ that guarantees that the current detector 7 stably executes the current detection. Consequently, the duties can be increased by a necessary minimum amount.

FIGS. 14A to 14D illustrate a third embodiment. Only the differences between the first and third embodiments will be described. FIGS. 3A to 3D show the case where the references of three phases U, V and W correspond with the bottoms of the triangular waves in the first embodiment. FIGS. 14A to 14D show a case where the references of phases U and W correspond with peaks of the triangular waves respectively while the phase V reference corresponds with the bottom of the triangular wave. In this case, three-phase PWM signal is supplied so that a maximum amplitude phase of the saw-tooth wave of the phase U carrier and a minimum amplitude phase of the reversed-phase saw-tooth wave of the phase V carrier correspond with the bottom of the triangular wave.

When the peak of the triangular wave is referred to as "detection timing A" and the time-point obtained after lapse of τ (time) is referred to as "detection timing B," phase U current $I_u$ having positive polarity can be detected since only U+ is turned on by the application of the detection timing A, and the phase W current $I_w$ having positive polarity can be detected since only W+ is turned on by the application of the detection timing B. Accordingly, the three-phase current can be detected in this case, too such that the third embodiment can achieve the same advantageous effects as the first embodiment.

Figure 15:
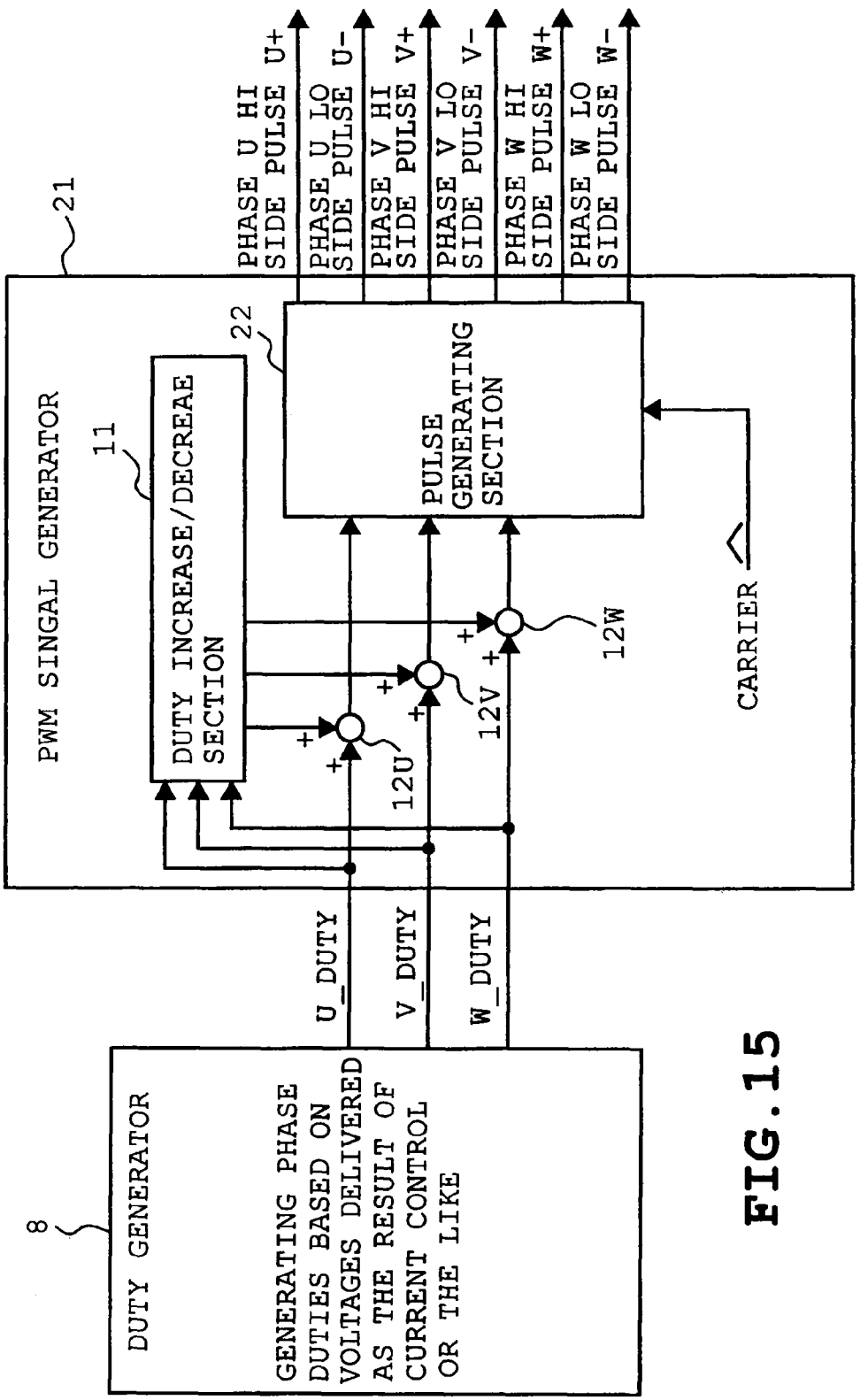
FIG. 15 is a block diagram similar to FIG. 2, showing a fourth embodiment.
Figures 20A, 20B, 20C, 20D:
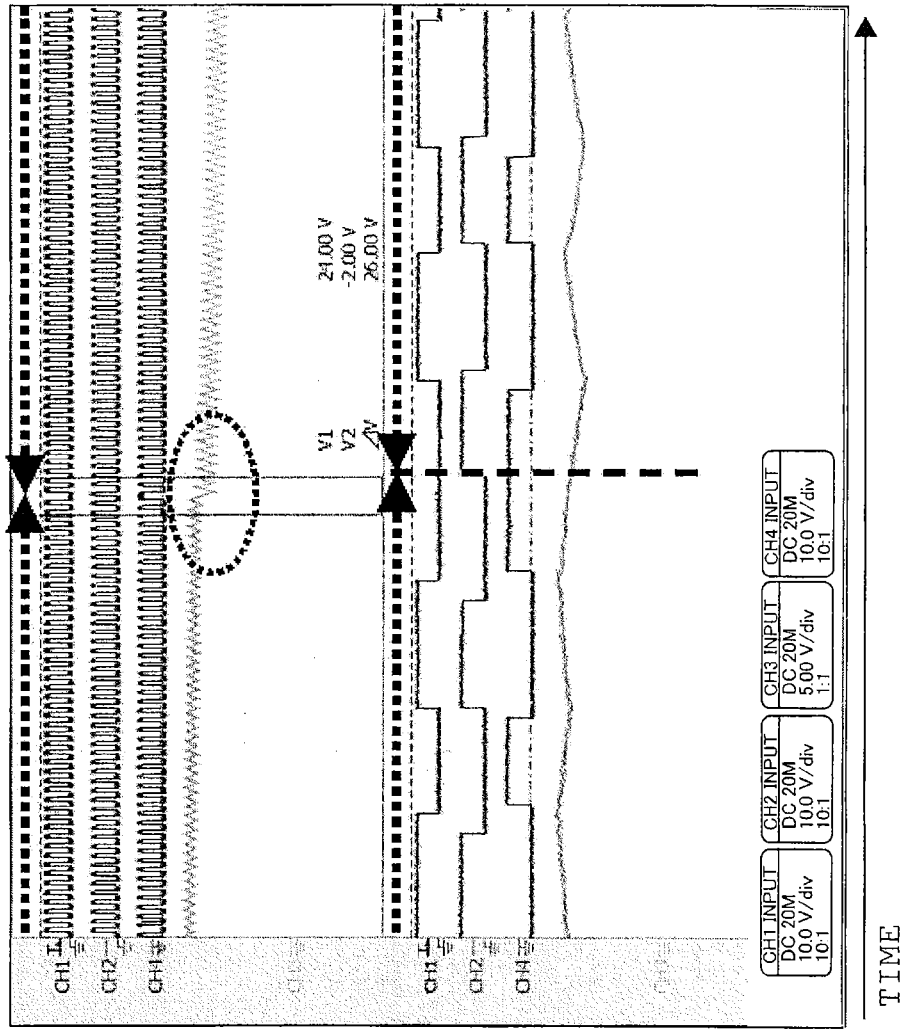
FIGS. 20A to 20D show a waveform obtained by actually measuring phase U current, showing the related art.

FIGS. 15 to 17B illustrate a fourth embodiment. FIG. 15 similar to FIG. 2 shows the configuration of the PWM signal generator (a PWM signal generating unit) 21 replaced for the PWM signal generator 9. The PWM signal generator 21 includes a pulse generating section 22 replaced for the pulse generating section 13. The pulse generating section 22 carries out a logical operation to shift the three-phase PWM signal pulses by the use of only one triangular wave carrier in the same manner as in the first embodiment.

FIGS. 16A and 16B show in what manner the three-phase duties U_DUTY, V_DUTY and W_DUTY should be compared with a single carrier for generation of the three-phase PWM signal pulses. In FIG. 16A, the phase U duty U_DUTY is designated by alternate long and short dash line, the phase V duty V_DUTY is designated by solid line, and phase W duty W_DUTY is designated by broken line. Regarding phase V, PWM signal pulses are supplied in a period in which a duty command V_DUTY is higher than the carrier. A period in which the carrier amplitude is increased is referred to as "first section." A period in which the carrier amplitude is decreased is referred to as "second section." Regarding phase U, PWM signal pulses are supplied when the duty command U_DUTY is lower than the carrier in the first section. PWM signal pulses are supplied when the duty command U_DUTY is higher than the carrier in the second section.

Regarding phase W, PWM signal pulses are supplied when the duty command W_DUTY is higher than the carrier in the first section. PWM signal pulses are supplied when the duty command W_DUTY is lower than the carrier in the second section. As a result, an output pattern of the three-phase PWM signal pulses relative to the carrier is identical with that in the first embodiment. FIGS. 17A and 17B show logics for the above-described signal processing executed by the pulse generating section 22.

The setting of the three-phase duties will be described next. As an example, each of phase U and V duties U_DUTY and V_DUTY is set at 80% and phase W duty W_DUTY is set at 30%. The carrier has a maximum amplitude MAX of 100%. Regarding phase V, firstly, high-voltage pulses are normally supplied in a section in which phase V_DUTY is lower than the triangular wave carrier. The phase V_DUTY processed by the duty increase/decrease section 11 is compared with the carrier in each of sections 1 and 2 with its value being maintained at 80% (V_DUTY=V_DUTY'). As a result, the phase V pulses are supplied as high-voltage pulses in the 80%-duty period with the carrier bottom being the center. Regarding the phase U duty U_DUTY, U_DUTY' of 40% obtained by subtracting doubled duty value 160% from doubled carrier MAX value 200% is compared in the first section with the carrier. Accordingly, pulses are generated with reference to the peak location of the carrier. Subsequently, the carrier maximum value 100% as U_DUTY is compared with the carrier in the second section. Accordingly, high-voltage pulses are generated all through the second section. Consequently, high-voltage pulses are supplied in the 80%-duty period as the phase U pulses.

Regarding phase W, lastly, the phase W duty W_DUTY of 30% processed by the duty increase/decrease section 11 is doubled into value 60%, which value is then compared with the carrier in the first section. Carrier maximum value of 100% as W_DUTY' is compared with the carrier. Since high-level pulses are logically supplied when the phase W duty has a lower level than the carrier, no pulses are supplied in the second section although the carrier takes the maximum value. As a result, the phase W pulses are supplied from the bottom of the carrier toward the peak thereof in a period corresponding to 30% of the PWM period.

The case of the three-phase PWM signal pulses as shown in FIGS. 16A and 16B has thus been described above. Set values differ depending upon the largeness of the duty. FIGS. 17A and 17B then show generalized logics for conversion of DUTY→DUTY'. More specifically, the phase V duty V_DUTY is set with no change. When a doubled phase U duty U_DUTY is smaller than the maximum value of carrier amplitude, phase U duty U_DUTY' to be supplied in the first section is set at carrier maximum, and phase U duty U_DUTY' to be supplied in the second section is set at the aforementioned doubled value. Furthermore, when the aforementioned doubled value is larger than the carrier maximum value, the phase U duty U_DUTY in the first section is set at a value obtained by subtracting U_DUTY' in the first section from a doubled carrier maximum value. The phase U duty U_DUTY' in the second section is set at the carrier maximum value.

When the double value of phase W duty W_DUTY is smaller than the carrier maximum value regarding phase W, the phase W duty W_DUTY' to be supplied in the first section is set at the aforementioned double value, and the phase W duty W_DUTY' to be supplied in the second section is set at the carrier maximum value. Furthermore, when the double value is larger than the carrier maximum value, the phase W duty W_DUTY to be supplied in the first section is set at the carrier maximum value, and the phase W duty W_DUTY' to be supplied in the second section is set at a value obtained by subtracting the double value from the doubled carrier maximum value.

In the fourth embodiment, the PWM signal generator 21 uses the triangular wave as the carrier. The section in which the amplitude of the triangular wave is increased is referred to as the first section and the section in which the amplitude of the triangular wave is decreased is referred to as the second section. Regarding the phase V signal of the three-phase PWM signals, the conditions for comparison to supply the PWM signal by comparison of the largeness relationship between the triangular wave amplitude and PWM commands are set to be constant throughout the first and second sections. Regarding phases U and W, the comparison conditions for the first section differ between the phases, and the comparison conditions for the second section is obtained by reversing the three-phase comparison conditions for the first section, whereby the three-phase PWM signal pulses are generated.

Regarding phase V, the phase V duty V_DUTY is set with no change. Regarding phases U and W, the double values of the phase U and W duties U_DUTY and W_DUTY are compared with the carrier maximum value. Phase U and W duties U_DUTY and W_DUTY to be set in each of the first and second sections are converted depending upon the results of comparison and according to the logics as shown in FIGS. 17A and 17B. As a result, the fourth embodiment can achieve the same advantageous effects as the first embodiment without use of the three types of carriers. It is optional what comparison conditions each phase should be applied to.

The timings for the current detector 7 to detect the two-phase currents within the carrier period may or may not be based on the phase representing the maximum or minimum level of the carrier. The timings may be set based on any phase of the carrier within a range in which two-phase currents are detectable.

Furthermore, the timings for current detection need not correspond with the PWM carrier period. For example, the current detection may be carried out in a period double or quadruple as long as the carrier period. Accordingly, the current detection timing signal supplied to the current detector 7 need not be the carrier itself. For example, a pulse signal may be used which is synchronized with the carrier and has a predetermined period, instead.

The shunt resistance 4 may be disposed on the positive bus bar 2a. Furthermore, the current detecting element should not be limited to the shunt resistance 4 but may be a current transformer (CT) or the like.

The switching elements should not be limited to the n-channel power MOSFETs but may be p-channel power MOSFETs, IGBTs, power transistors or the like.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A motor control device comprising:
   an inverter circuit including a plurality of switching elements connected into a three-phase bridge configuration, the inverter circuit being configured to convert a direct current into a three-phase alternate current to drive an electric motor;
   a current detecting element connected to a direct current side of the inverter circuit, thereby generating a signal corresponding to a current value;
   a PWM signal generating unit which is configured to determine a rotor position based on the phase current of the motor and to generate a three-phase PWM signal pattern so that the signal pattern follows the rotor position; and
   a current detecting unit which is configured to detect the phase current based on the signal generated by the current detecting element and the PWM signal pattern,
   wherein the PWM signal generating unit is configured to compare a PWM command voltage and a carrier wave with each other thereby to generate a pulse signal so that a duty is increased or decreased in both directions of phase lag and phase lead with anyone of phases within the carrier period serving as a reference regarding one phase of a three-phase PWM signal;
   the PWM signal generating unit is configured to generate a pulse signal so that a duty is increased or decreased in one of the directions of phase lag and phase lead with anyone of phases within the carrier period serving as a reference regarding another phase of the three-phase PWM signal; and
   the PWM signal generating unit is configured to generate a pulse signal so that a duty is increased or decreased in a direction reverse to said one of the directions phase lag and phase lead with anyone of phases within the carrier period serving as a reference regarding the other phase of the three-phase PWM signal,
   whereby the PWM signal generating unit is configured to generate the three-phase PWM signal pattern so that the current detecting unit is capable of detecting a two-phase current in synchronization with advent of two predetermined time-points within a carrier wave period of the PWM signal with the first to third phases being normally fixed without phase substitution.

2. The motor control device according to claim 1, wherein the PWM signal generating unit is configured to set the references of the phases based on phases in which an amplitude of the carrier wave is maximum or minimum, respectively.

3. The motor control device according to claim 1, wherein:
   the PWM signal generating unit uses a triangular wave as the carrier;
   when a section where an amplitude of the triangular wave is increased is a first section and a section where the amplitude of the triangular wave is decreased is a second section, comparison conditions under which the triangular wave amplitude and the PWM signal are compared with each other about a magnitude relation are constant in the first and second sections regarding one of the three phase PWM signals;
   regarding the other two phase PWM signals, comparison conditions for the first section differ between the two phases and comparison conditions for the second section are obtained by reversing the comparison conditions for the first section;
   regarding said other two phases, double values of set duties and the maximum amplitude values of the carrier waves are compared with each other respectively;
   regarding one of said other two phases, when the double value of the duty is smaller than the maximum value, a duty of the PWM signal supplied in one of the first or second sections is set at a maximum value, and a duty of the PWM signal supplied in the other section is set at the double value of the duty;
   when the double value of the duty is larger than the maximum value, a duty of the PWM signal supplied in one of the first or second sections is set at a value obtained by subtracting the double value of the duty from the doubled maximum value, and a duty of the PWM signal supplied in the other section is set at the maximum value;
   regarding the other of said other two phases, when the double value of the duty is smaller than the maximum value, a duty of the PWM signal supplied in one of the first or second sections is set at the double value of the duty, and a duty of the PWM signal supplied in the other section is set at the maximum value; and
   when the double value of the duty is larger than the maximum value, a duty of the PWM signal supplied in one of the first or second sections is set at the maximum value, and a duty of the PWM signal supplied in the other section is set at a value obtained by subtracting the double value of the duty from the doubled maximum value.

4. The motor control device according to claim 1, wherein:
   the PWM signal generating unit uses a triangular wave as the carrier wave regarding one of three-phase PWM signals;
   the PWM signal generating unit uses a first saw-tooth wave as the carrier wave regarding one of the remaining two-phase PWM signals, the saw-tooth wave having a phase that is indicative of a maximum amplitude and corresponds with a phase that is indicative of a maximum or minimum amplitude of the triangular wave;
   regarding one of the remaining two phases, the PWM signal generating unit uses as the carrier wave a second saw-tooth wave having an amplitude;

regarding the other phase, the PWM signal generating unit uses as the carrier wave a saw-tooth wave that has a reverse phase relationship with the first saw-tooth wave; and the phases have respective phase references that are set based on a phase in which maximum or minimum amplitude values of the carrier waves correspond with one another.

5. The motor control device according to claim 1, wherein when the phase PWM duties become insufficient for generation of three-phase PWM signal patterns based on which the current detecting unit is capable of detecting two-phase currents, the PWM signal generating unit generates PWM signals by adding duties with respective equal values to the three-phase PWM duties.

6. The motor control device according to claim 5, wherein the PWM signal generating unit executes the duty addition so that a smallest one of the three-phase PWM duties becomes not less than twice as long as a stability time that guarantees a stable current detection by the current detecting unit.

7. A motor control device comprising:
an inverter circuit including a plurality of switching elements connected into a three-phase bridge configuration, the inverter circuit being configured to convert a direct current into a three-phase alternate current to drive an electric motor;
a current detecting element connected to a direct current side of the inverter circuit, thereby generating a signal corresponding to a current value;
a current detecting unit which is configured to detect the phase current based on the signal generated by the current detecting element and a PWM signal pattern;
a PWM signal generating unit which is configured to determine a rotor position based on the phase current of the motor, the PWM signal generating unit being further configured to increase or decrease a duty in both directions of phase lag and phase lead with anyone of phases within the carrier period serving as a reference regarding one phase of a three-phase PWM signal so that the duty follows the rotor position, to increase or decrease a duty in one of both directions of phase lag and phase lead with anyone of phases within the carrier period serving as a reference regarding another phase of the three-phase PWM signal and to increase or decrease a duty in a direction reverse to said one of the directions regarding the other phase of the three-phase PWM signal, thereby generating a three-phase PWM signal pattern so that the current detecting unit is capable of detecting a two-phase current in synchronization with advent of two predetermined time-points within a carrier wave period of the PWM signal.

8. The motor control device according to claim 7, wherein the PWM signal generating unit is configured to set the references of the phases based on phases in which an amplitude of the carrier wave is maximum or minimum, respectively.

9. The motor control device according to claim 7, wherein:
the PWM signal generating unit uses a triangular wave as the carrier;
when a section where an amplitude of the triangular wave is increased is a first section and a section where the amplitude of the triangular wave is decreased is a second section, comparison conditions under which the triangular wave amplitude and the PWM signal are compared with each other about a magnitude relation are constant in the first and second sections regarding one of the three phase PWM signals;

regarding the other two phase PWM signals, comparison conditions for the first section differ between the two phases and comparison conditions for the second section are obtained by reversing the comparison conditions for the first section;

regarding said other two phases, double values of set duties and the maximum amplitude values of the carrier waves are compared with each other respectively;

regarding one of said other two phases, when the double value of the duty is smaller than the maximum value, a duty of the PWM signal supplied in one of the first or second sections is set at a maximum value, and a duty of the PWM signal supplied in the other section is set at the double value of the duty;

when the double value of the duty is larger than the maximum value, a duty of the PWM signal supplied in one of the first or second sections is set at a value obtained by subtracting the double value of the duty from the doubled maximum value, and a duty of the PWM signal supplied in the other section is set at the maximum value;

regarding the other of said other two phases, when the double value of the duty is smaller than the maximum value, a duty of the PWM signal supplied in one of the first or second sections is set at the double value of the duty, and a duty of the PWM signal supplied in the other section is set at the maximum value; and when the double value of the duty is larger than the maximum value, a duty of the PWM signal supplied in one of the first or second sections is set at the maximum value, and a duty of the PWM signal supplied in the other section is set at a value obtained by subtracting the double value of the duty from the doubled maximum value.

10. The motor control device according to claim 7, wherein:
the PWM signal generating unit uses a triangular wave as the carrier wave regarding one of three-phase PWM signals;
the PWM signal generating unit uses a first saw-tooth wave as the carrier wave regarding one of the remaining two-phase PWM signals, the saw-tooth wave having a phase that is indicative of a maximum amplitude and corresponds with a phase that is indicative of a maximum or minimum amplitude of the triangular wave;
regarding one of the remaining two phases, the PWM signal generating unit uses as the carrier wave a second saw-tooth wave having an amplitude;
regarding the other phase, the PWM signal generating unit uses as the carrier wave a saw-tooth wave that has a reverse phase relationship with the first saw-tooth wave; and
the phases have respective phase references that are set based on a phase in which maximum or minimum amplitude values of the carrier waves correspond with one another.

11. The motor control device according to claim 7, wherein when the phase PWM duties become insufficient for generation of three-phase PWM signal patterns based on which the current detecting unit is capable of detecting two-phase currents, the PWM signal generating unit generates PWM signals by adding duties with respective equal values to the three-phase PWM duties.

12. The motor control device according to claim 11, wherein the PWM signal generating unit executes the duty addition so that a smallest one of the three-phase PWM duties becomes not less than twice as long as a stability time that guarantees a stable current detection by the current detecting unit.

13. A motor control device comprising:
- an inverter circuit including a plurality of switching elements connected into a three-phase bridge configuration, the inverter circuit being configured to convert a direct current into a three-phase alternate current to drive an electric motor;
- a current detecting element connected to a direct current side of the inverter circuit, thereby generating a signal corresponding to a current value;
- a PWM signal generating unit which is configured to determine a rotor position based on the phase current of the motor, thereby generating a three-phase PWM signal pattern so that the signal pattern follows the rotor position; and
- a current detecting unit which is configured to detect the phase current based on the signal generated by the current detecting element and the PWM signal pattern, wherein:
- the PWM signal generating unit is configured to compare a PWM command voltage and a carrier wave with each other thereby to generate a pulse signal so that a duty is increased or decreased in both directions of phase lag and phase lead with anyone of phases within the carrier period serving as a reference regarding one phase of a three-phase PWM signal;
- the PWM signal generating unit is configured to generate a pulse signal so that a duty is increased or decreased in one of the directions of phase lag and phase lead with anyone of phases within the carrier period serving as a reference regarding another phase of the three-phase PWM signal; and
- the PWM signal generating unit is configured to generate a pulse signal so that a duty is increased or decreased in a direction reverse to said one of the directions phase lag and phase lead with anyone of phases within the carrier period serving as a reference regarding the other phase of the three-phase PWM signal,
- whereby the PWM signal generating unit is configured to generate the three-phase PWM signal pattern so that the current detecting unit is capable of detecting a two-phase current in synchronization with advent of two predetermined time-points within a carrier wave period of the PWM signal.

14. The motor control device according to claim 13, wherein the PWM signal generating unit is configured to set the references of the phases based on phases in which an amplitude of the carrier wave is maximum or minimum, respectively.

15. The motor control device according to claim 13, wherein:
- the PWM signal generating unit uses a triangular wave as the carrier;
- when a section where an amplitude of the triangular wave is increased is a first section and a section where the amplitude of the triangular wave is decreased is a second section,
- comparison conditions under which the triangular wave amplitude and the PWM signal are compared with each other about a magnitude relation are constant in the first and second sections regarding one of the three phase PWM signals;
- regarding the other two phase PWM signals, comparison conditions for the first section differ between the two phases and comparison conditions for the second section are obtained by reversing the comparison conditions for the first section;
- regarding said other two phases, double values of set duties and the maximum amplitude values of the carrier waves are compared with each other respectively;
- regarding one of said other two phases, when the double value of the duty is smaller than the maximum value, a duty of the PWM signal supplied in one of the first or second sections is set at a maximum value, and a duty of the PWM signal supplied in the other section is set at the double value of the duty;
- when the double value of the duty is larger than the maximum value, a duty of the PWM signal supplied in one of the first or second sections is set at a value obtained by subtracting the double value of the duty from the doubled maximum value, and a duty of the PWM signal supplied in the other section is set at the maximum value;
- regarding the other of said other two phases, when the double value of the duty is smaller than the maximum value, a duty of the PWM signal supplied in one of the first or second sections is set at the double value of the duty, and a duty of the PWM signal supplied in the other section is set at the maximum value; and
- when the double value of the duty is larger than the maximum value, a duty of the PWM signal supplied in one of the first or second sections is set at the maximum value, and a duty of the PWM signal supplied in the other section is set at a value obtained by subtracting the double value of the duty from the doubled maximum value.

16. The motor control device according to claim 13, wherein:
- the PWM signal generating unit uses a triangular wave as the carrier wave regarding one of three-phase PWM signals;
- the PWM signal generating unit uses a first saw-tooth wave as the carrier wave regarding one of the remaining two-phase PWM signals, the saw-tooth wave having a phase that is indicative of a maximum amplitude and corresponds with a phase that is indicative of a maximum or minimum amplitude of the triangular wave;
- regarding one of the remaining two phases, the PWM signal generating unit uses as the carrier wave a second saw-tooth wave having an amplitude;
- regarding the other phase, the PWM signal generating unit uses as the carrier wave a saw-tooth wave that has a reverse phase relationship with the first saw-tooth wave; and
- the phases have respective phase references that are set based on a phase in which maximum or minimum amplitude values of the carrier waves correspond with one another.

17. The motor control device according to claim 13, wherein when the phase PWM duties become insufficient for generation of three-phase PWM signal patterns based on which the current detecting unit is capable of detecting two-phase currents, the PWM signal generating unit generates PWM signals by adding duties with respective equal values to the three-phase PWM duties.

18. The motor control device according to claim 17, wherein the PWM signal generating unit executes the duty addition so that a smallest one of the three-phase PWM duties becomes not less than twice as long as a stability time that guarantees a stable current detection by the current detecting unit.

* * * * *